Figure 1:
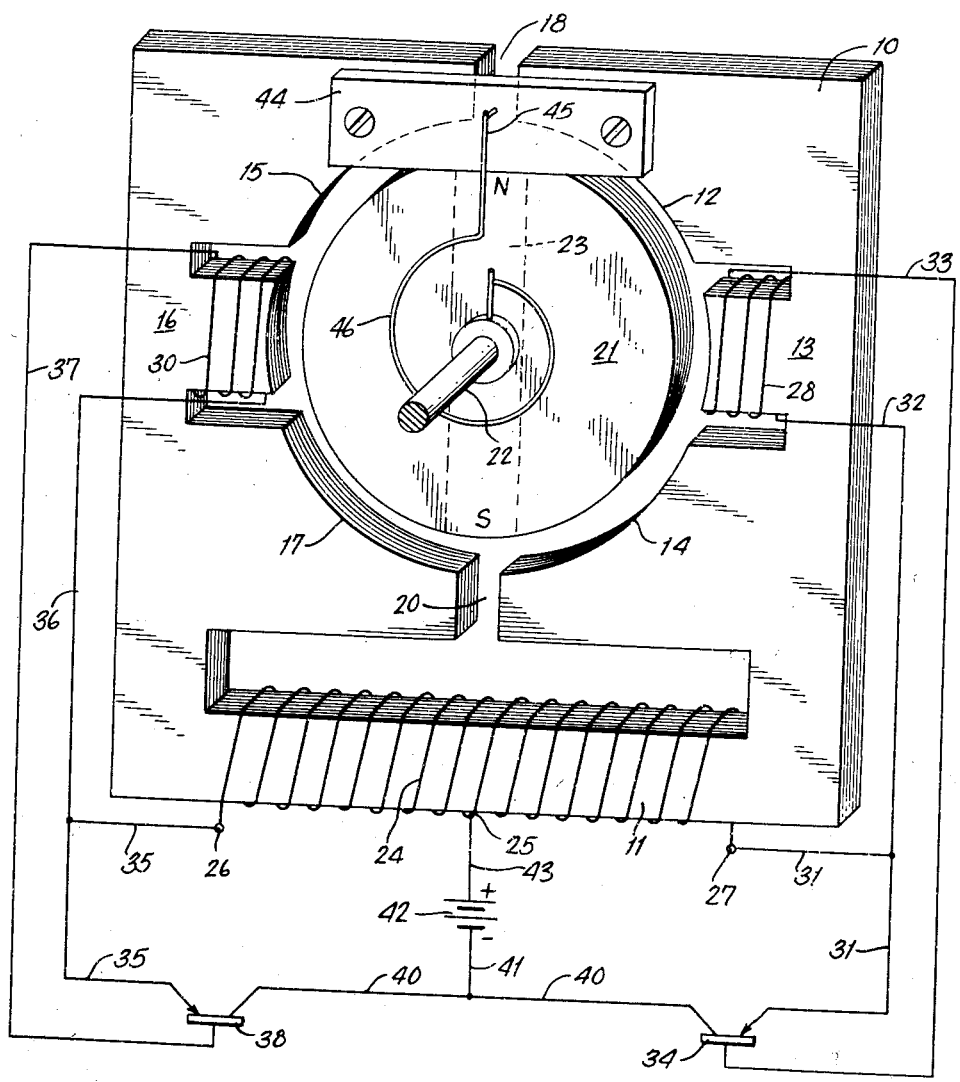

Nov. 6, 1956 H. D. BRAILSFORD 2,769,946
OSCILLATING COMMUTATORLESS DIRECT CURRENT MOTOR
Filed Feb. 16, 1955 2 Sheets-Sheet 1

INVENTOR.
HARRISON D. BRAILSFORD
BY Darby & Darby
ATTORNEYS

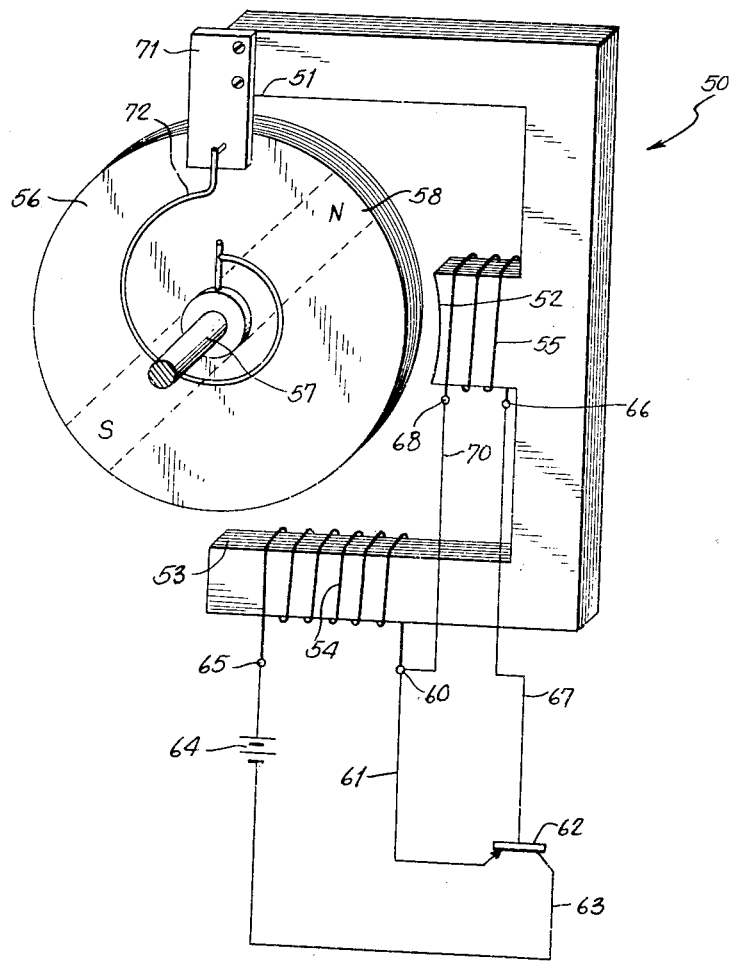

United States Patent Office 2,769,946
Patented Nov. 6, 1956

2,769,946
OSCILLATING COMMUTATORLESS DIRECT CURRENT MOTOR

Harrison D. Brailsford, Rye, N. Y.

Application February 16, 1955, Serial No. 488,525

14 Claims. (Cl. 318—128)

The present invention relates to an oscillatory direct current motor and more particularly to such a motor which requires no commutator, make or break, or vibrating contacts.

More particularly still the invention relates to an oscillating direct current motor having transistors in the field circuits thereof which transistors perform the commutating function.

A rotary direct current commutatorless motor utilizing transistors is disclosed in my copending application Serial No. 435,759, filed June 10, 1954, now Patent No. 2,753,501. The motor of the instant invention is based upon the motor of that application, but is modified to provide an oscillatory rather than a rotary movement.

In the motor of the instant invention as in that of the prior application the use of transistors and consequent elimination of conventional commutating means greatly increases the life of the motor since the life is normally limited by the commutating device, the parts of which are necessarily made of soft highly conductive materials.

The oscillatory motor of the present invention has many uses, amongst which may be mentioned as the power source for a clock movement, and as the power source for displays having moving parts. However, in the present application the motor will be described without relation to its particular use.

It is an object of the invention to provide an oscillatory direct current motor in which no commutator is employed and which does not use moving contacts.

It is a further object of the invention to provide such an oscillatory direct current motor which may be utilized as the motive source for a clock which thus requires no spring which is wound by electrical or other power.

It is a further object of the invention to provide such an oscillatory direct current motor which is inherently incapable of producing radio frequency interference.

It is a further object of the invention to provide such an oscillatory direct current motor in which each oscillatory movement of the rotor is performed in a definite time period, the rotor thus being identical in principle to a torsional pendulum and therefore well adapted for the control of a clock mechanism.

It is a still further object to provide an electro-mechanical transducer comprising a mechanical resonant structure having an oscillating mass cooperating with an elastic compliance driven magnetically from a direct current source and in which the period of vibration is determined by the mass of the oscillating part and the compliance of the elastic part and is independent of the driving voltage.

It is a still further object to provide a precision oscillator of small size in which the frequency generated is a function of the mechanically vibrating structure; such an oscillator even when operating in the very low sub-audible frequency range since the large capacitors and inductors normally required for present oscillators are no longer necessary.

Other objects and features of the invention will be apparent when the following description is considered in connection with the annexed drawings, in which, Figure 1 is a schematic perspective view of one form of the oscillating direct current motor of my invention; and Fig. 2 is a similar view of a slightly modified form of the motor of Figure 1.

Referring now to the drawings, the motor comprises a soft iron pole structure 10 having the common core portion 11 and the pole faces 12, 13 and 14 at one side of the core portion 11 and the pole faces 15, 16 and 17 at the opposite side thereof. The pole faces 12, 13, 14, 15, 16 and 17 are arranged to lie on the surface of a cylinder, the faces 12, 13 and 14 being separated from the faces 15, 16 and 17 by means of the pole gaps 18 and 20. A rotor 21 is fixed to shaft 22 for rotation therewith, the shaft 22 being supported in suitable bearings, not shown, the rotor being mounted concentrically within the cylinder formed in the manner described above. Rotor 21 is magnetized along the diametrical band as indicated at 23, one end of the diameter being a north pole and the opposite end a south pole.

Wound on the common core piece 11 is a coil 24 which is center tapped at 25 and provided with the end terminals 26 and 27.

A winding 28 is placed upon the pole pieces 13 and a similar winding 30 is placed upon the pole piece 16. Terminal 27 of the center tapped winding 24 is connected by means of conductors 31 and 32 to one end of the winding 28, the opposite end of that winding being connected by means of conductor 33 to the base of a transistor 34.

In a similar manner terminal 26 of the center tapped winding 24 is connected by means of conductors 35 and 36 to one end of the winding 30, the other end of this winding being connected by means of conductor 37 to the base of a transistor 38.

Terminal 27 is also connected by means of conductor 31 to the emitter of transistor 34 and terminal 26 is connected through conductor 35 to the emitter of transistor 38. The collector terminals of transistors 34 and 38 are connected by means of conductors 40 and 41 to the negative side of a battery 42 the positive terminal of which is connected by means of conductor 43 to the center tapped terminal 25 of the winding 24.

Bridging across the gap 18 between the opposite faces 12 and 15 of the field structure 10 is a bridge 44 of non-magnetic material which has fixed thereto at its center one end of a spring 45. Spring 45 is formed with a spiral turn therein as shown at 46 and is connected at its opposite end by any suitable means to the shaft 22. The spring normally holds the shaft in the position shown with the magnetized area of the disk 21 extending from the gap 18 to the gap 20.

The device described above operates in the following manner.

With the structure at rest the permanent magnet rotor 21 seeks the position illustrated in which the spring 45 is unstressed. If rotor 21 is now turned slightly in a clockwise direction current will be induced in the coil 28. This current flows in such a direction as to put a negative bias on the base of transistor 34 thus rendering that transistor conductive. As a result current flows from the positive pole of the battery 42 through conductor 43, the right hand half of winding 24, thence through conductor 31 to the emitter terminal of transistor 34 and through the transistor and conductors 40 and 41 to the negative pole of battery 42. As long as negative polarity is maintained on the base of transistor 34 this condition will prevail.

Current flowing through the right hand half of the coil 24 causes magnetization of the field structure 10 in a direction to produce a clockwise torque on the disk 21. In other words, the winding 24 is so poled that when transistor 34 is conducting the pole faces 12, 13 and 14 are south poles while the pole faces 15, 16 and 17 are north poles, thus causing the disk 21 to rotate further in the clockwise direction.

This movement continues until the reaction of spring 45, which is now being stressed, counterbalances the magnetic tractive effort. When the forces balance the rotation of the disk 21 ceases and therefore current ceases to be induced in coil 28 and transistor 34 becomes non-conductive. Due to this, the magnetic field of pole pieces collapses and the spring 45 being no longer balanced by the magnetic tractive effort initiates counterclockwise movement of the disk 21 which, due to inertia effects, moves beyond its starting point.

As the rotor moves in the counterclockwise direction currents are induced in the winding 30 which cause a negative bias to be applied to the base of transistor 38 over circuits similar to those described in connection with coil 28 and transistor 34. As a result of the conduction of transistor 38 current flows through the left hand half of winding 24 the path being similar to that traced for the right hand half of this winding but passing through transistor 38 instead of transistor 34. The poling of the winding 24 is, as has been stated, such as to cause the pole faces 12, 13 and 14 to become north poles at this time, the pole faces 15, 16 and 17 being south poles. As a result, the disk 21 continues its rotation in the counterclockwise direction until the reaction of the spring balances the magnetic effort at which time the disk stops and the transistor 38 becomes non-conducting. Again, the magnetic field of the pole pieces collapses and the spring, being unopposed, starts the rotor in the clockwise direction toward its initial point.

The disk 21 will therefore oscillate back and forth about its neutral or starting position. The length of time taken to complete one cycle will be a function of the mass or polar moment of inertia of the disk 21 and of the compliance of spring 45.

The device of Figure 2 is a somewhat simplified structure operating however in substantially the same manner as that of Figure 1. The motor of Figure 2 comprises the E shaped pole structure having pole faces designated 51, 52 and 53.

Wound on the lower arm of the structure 50 is a driving winding 54 and wound on the central pole is a control winding 55. A rotor 56, identical to rotor 21, is supported on a shaft 57. The rotor 57 is magnetized along a central band indicated in dotted lines at 58.

Terminal 60 of driving winding 54 is connected through conductor 61 to the emitter terminal of a transistor 62, the collector terminal of this transistor being connected by means of conductor 63 and battery 64 to the other terminal 65 of driving winding 54.

Also terminal 66 of control winding 55 is connected by means of conductor 67 to the base terminal of transistor 62 and the other terminal 68 of control winding 55 is connected through conductor 70 to conductor 61 and hence to both terminal 60 of winding 54 and emitter of transistor 62.

A non-magnetic plate 71 is fixed to the upper arm of pole structure 50 and rigidly fixed to this plate is a spiral spring 72 the other end of which is fixed to shaft 57. The spring 72 is so oriented with respect to shaft 57 that the magnetized bar lies at an angle to a line joining the left ends of pole faces 51 and 53.

The operation of the motor of Figure 2 is exactly similar to the operation previously described for Figure 1. If rotor 56 is turned counterclockwise manually, the initial rotation will generate a current in control winding 55 which will bias transistor 62 to conduction. Current will then flow from battery 64 through driving winding 54 and emitter and collector terminals of now conductive transistor 62 to cause additional counterclockwise rotation of rotor 56, the pole face 51 being a south and the pole face 53 a north pole.

The rotor continues its counterclockwise rotation until the resistance of spring 71 brings it to a stop at which time the flux collapses, current ceases to flow in winding 55 and transistor 62 becomes non-conductive. The driving pulse ceases and spring 71 returns the rotor toward, and due to inertia beyond, the original position. The spring then moves the rotor in the original direction which again produces the conditions heretofore described and initiates another cycle.

Both devices are thus identical in principle to the well-known torsional pendulum frequently used for the control of a clock mechanism. In a similar manner to that of the usual clock mechanism the oscillating disk and shaft can be coupled to a time indicating mechanism by means of a simple pawl and ratchet arrangement or other suitable equivalent mechanism. Thus either of the devices of this invention may be utilized as the driving element for a clock mechanism power being supplied by a small direct current battery, such for example as a 6 volt battery. Although not at all limited to this use, such a clock is advantageous in automotive use since it may be driven by the usual storage battery but without the complication of contacts normally employed to actuate a solenoid and thus wind a spring to drive the clock mechanism.

Many other uses of such a direct current clock are of course contemplated as, for example, in regions where frequency controlled A. C. power is not available. Additionally, as has been stated hereinabove, the mechanism may be utilized in connection with other devices than clocks such, for example, as in window displays having oscillatory moving parts.

As indicated hereinabove the device is also adapted to use as a transducer or oscillator, to adapt it to such use it is only necessary to connect the electrical load across the terminals of the driving winding.

While I have described a preferred embodiment of the invention, it will be understood that I wish to be limited not by the foregoing description, but solely by the claims granted to me.

What is claimed is:

1. An oscillating commutatorless D. C. motor comprising, an electromagnetic field structure, a rotor comprising a permanently magnetized bar mounted for rotation with respect to said field structure, at least one driving winding on said field structure, at least one control winding on said field structure, at least one transistor, means connecting each said transistor to one of said control windings to bias said transistor to conduction when said rotor rotates, means connected to said transistor and said driving winding to produce a flow of current in said driving windings when said transistor is conductive and means to urge said rotor to a normal position with respect to said field structure and to resist movement from said normal position, said means serving to limit the movement of said rotor under urge of said driving winding to thereby cause said rotor to oscillate about said normal position under control of said windings and said transistors.

2. An oscillating commutatorless direct current electric motor comprising, in combination, an electromagnetic field structure, a rotor comprising a permanently magnetized bar mounted for rotation with respect to said field structure, driving windings on said field structure, control windings on said field structure, transistors, means connecting said transistors across said control windings to bias said transistors to conduction alternately when said rotor rotates, means connected to said transistors and said driving windings to cause a flow of current in said driving windings respectively when said transistors are conductive, and means to urge said rotor to a normal position with respect to said field structure, and to resist movement of said rotor from said normal position, said means serving to limit the movement of said rotor under urge of said driving windings to thereby cause said rotor to oscillate about said normal position under control of said windings and said transistors.

3. An oscillatory direct current electric motor comprising, in combination, a stationary electromagnetic field structure including pole faces and core portions, a permanently magnetized bar, means rotatably mounting said bar within said field structure, driving windings on core portions of said field structure, control windings on other core portions of said field structure, means urging said bar to a neutral position with respect to said field structure, and a circuit including a source of direct current and transistors connected to said driving and control windings, said transistors being rendered selectively conductive in response to rotation of said bar to supply current from said source to said driving windings selectively to thereby produce pulses in said field structure for rotating said bar, said urging means resisting said rotation and bringing about cessation of conductivity of said transistors selectively, said urging means returning said bar toward and beyond said neutral position, the cycle then being repeated in the opposite direction.

4. An oscillatory direct current electric motor as claimed in claim 3, characterized in that said field structure comprises a common core portion on which said driving windings are wound and a divided pole face structure having air gaps 180° apart, each half of said field structure having a pole piece on which one of said control windings is wound, and further characterized in that current generated in said control windings renders one of said transistors conductive to supply current to the driving windings in such a direction as to continue the rotation in the direction in which it was initiated.

5. An oscillatory direct current electric motor comprising, in combination, a stationary electromagnetic field structure, said field structure having a common core portion and sets of pole faces arranged in circular formation, said sets being separated from each other by diametrically located air gaps, a rotor comprising a permanently magnetized bar, means mounting said bar for rotation in a circle concentric with said pole faces, driving windings on said common core portion of said field structure, control windings on diametrically opposite ones of said pole faces removed from said air gaps, means for urging said rotor to a position wherein said bar extends diametrically across said air gaps and a circuit including a source of direct current and transistors connected to said driving and control windings, said transistors being rendered selectively conductive in response to oscillation of said rotor and generation of current in said control windings to produce currents in said driving windings and further rotation of said rotor, said urging means resisting rotation and stopping said rotor thereby causing collapse of flux in said control windings and non-conductivity of said transistors, said urging means returning said rotor toward and beyond its original position and thus initiating repetition of the cycle in the opposite direction of rotation of said rotor.

6. A device as claimed in claim 5, characterized in that said urging means is a torsional spring, said spring being fixed to said shaft at one end and fixed with relation to said field structure at the opposite end.

7. A device as claimed in claim 5, characterized in that said driving windings comprise oppositely poled windings, said control windings comprise oppositely poled windings, and the bases of said transistors are connected individually to said control windings to be rendered conductive by flux generated in said windings, the collector terminals of said transistors being individually connected to said driving windings to produce flow of current therethrough when said corresponding transistors are rendered conductive.

8. A device as claimed in claim 7, characterized in that said oppositely poled control windings comprise a pair thereof, said transistors comprise a pair thereof, a source of direct current, the emitter terminals of said transistors being connected together and to the negative terminal of said source of direct current, said driving windings comprise a pair each having one terminal thereof connected individually to the emitter terminal of one of said transistors, the other terminals of said driving windings being connected together and to the positive terminal of the said source of direct current whereby oscillation of said bar generates a magnetic flux in said control windings selectively placing a negative bias on the corresponding one of said transistors, thereby rendering said transistor conductive and supplying current from said source to a corresponding one of said driving windings to further rotate said rotor bar.

9. An oscillatory direct current motor comprising, in combination, a soft iron pole piece, said pole piece having a plurality of pole faces, a circular opening through said pole piece, said opening being symmetrical with respect to said pole faces, a shaft extending through said central opening, a rotor mounted on said shaft for rotation in the plane of said pole piece and concentric to said openings, said rotor comprising a permanently magnetized bar magnetized to produce opposite poles at the ends thereof, a center tapped coil wound on a core portion of said pole piece, a pair of coils mounted on auxiliary core portions of said pole piece, a torsional spring fixed to said shaft and to said stationary field structure, a pair of transistors each having its base and emitter terminal connected across one of the coils of said pair, means joining the collector terminals of said transistors, a source of direct current, means connecting said joined collector terminals to the negative pole of said source, means connecting the positive pole of said source to the center tap of said center tapped coil, and means connecting each of the remaining terminals of said center tapped coil to the emitter terminal of a corresponding one of said transistors whereby rotation of said rotor produces a flux in said core and a corresponding current in said pair of coils to negatively bias one of said transistors and render it conductive thus permitting current from said source to flow through one-half of said center tapped coil to impart a driving pulse to said rotor, said rotation of said rotor being resisted by said torsional spring, said spring causing said rotor to stop, thus removing bias from said transistor and causing said driving pulse to cease, said spring then returning said shaft and rotor to and beyond normal position whereupon said cycle of operations is repeated.

10. An oscillatory direct current motor comprising, in combination, a soft iron pole piece having core portions and pole faces separated by an air gap, said pole faces forming a circular opening, said gaps being at a diameter of said opening, a rotor mounted for rotation in the plane of said pole faces, said rotor comprising a diametrically magnetized bore having its poles at the ends thereof, a plurality of driving windings on said core portions for producing magnetic flux in associated pole faces, control windings on others of said core portions, said windings having currents induced therein by said permanently magnetized rotor as said rotor rotates, means for resiliently urging said rotor to an initial position in which the poles of said rotor lie adjacent the gaps between said pole faces, a plurality of transistors each having base, collector and emitter terminals, said transistors being equal in number to the number of driving windings, means connecting each said control winding across the emitter and base terminal of one of said transistors to thereby bias said transistor to conduct when said rotor is rotated in one direction, a source of direct current, means connecting said source in series with one of said driving windings across the base and collector terminals of said one of said transistors to thereby produce a current flow through said transistor and said driving winding to attract said rotor further in the established direction of rotation, said resilient means resisting said rotation and causing said rotor to stop thereby ceasing to generate current in said control winding removing the bias from said transistor thereby restoring it to non-conducting condition and permitting said rotor to return toward and beyond said initial position to thereby cause repetition of the cycle in the opposite direction of rotation.

11. An oscillating direct current motor comprising, in combination, a stationary electromagnetic field structure including pole pieces and core portions, said pole pieces lying adjacent each other and being joined by a common core portion, said pole pieces being apertured to form facing semi-cylindrical pole faces with an air gap therebetween on a diameter of said cylinder, notches extending substantially radially outward from each said semi-cylindrical pole face forming an auxiliary core portion on each pole piece, driving windings on said common core portion, a control winding on each auxiliary core portion, a rotor comprising a bar permanently magnetized to form opposite magnetic poles on its opposite ends, means mounting said bar for rotation concentrically in the cylindrical aperture formed by said pole faces, a pair of transistors each having base, collector and emitter terminals, means connecting each control winding across the emitter and base terminals of a corresponding one of said transistors, a source of direct current, means connecting said source in series with one of said driving windings across the base and collector terminals of said corresponding one of said transistors, said driving windings and control windings associated with one transistor being oppositely poled to those associated with the other transistor whereby each said control winding biases said associated transistor to conductive position upon initiation of a cycle of oscillation in one direction and said associated driving winding receives a pulse from said source through said corresponding transistor to continue rotation in the same direction, and means urging said rotor to a neutral position in which the longitudinal axis of the rotor bar is in alignment with the air gap between pole faces, said urging means resisting rotation of the motor in either direction and overcoming the driving force thereby stopping the rotor, collapsing the flux in said control winding, rendering the transistors selectively non-conducting to cause the driving pulse to cease to permit the urging means to return the rotor to and beyond the said neutral position to initiate a cycle of oscillation in the opposite direction, said rotor having sufficient inertia to assure return thereof beyond said neutral position under urge of said urging means.

12. An oscillatory direct current electric motor comprising, in combination, a stationary electromagnetic field structure including pole faces and core portions, a permanently magnetized bar, means rotatably mounting said bar with respect to said field structure, a driving winding on one core portion of said field structure, a control winding on a second core portion of said field structure, means urging said bar to a normal initial position with respect to said field structure, and a circuit including a source of direct current and a transistor, said transistor having its base and emitter terminals connected across said control winding to be rendered conductive when said rotor is moved from said normal position, and said transistor having its collector and emitter terminals in series with said current source and said driving windings to thereby permit current flow in said driving winding to cause further rotation of said bar, said urging means resisting said rotation and bringing about cessation of rotation and conductivity of said transistor, said urging means then returning said bar beyond normal position in the opposite direction and then in the same direction, said movement in the same direction again rendering said transistor conductive and causing repetition of said cycle.

13. A device as claimed in claim 12, characterized in that said field structure comprises an E shaped magnetic core, said control winding being mounted on the central bar of said E shaped structure and said driving winding being mounted on the U portion of said E shaped core, the ends of the arms of said E comprising said pole faces being concentric with the mounting of said bar.

14. A device as claimed in claim 13, characterized in that said urging means is a torsional spring, said spring being fixed to said shaft at one end and fixed with relation to said field structure at the opposite end.

References Cited in the file of this patent

UNITED STATES PATENTS

| | | |
|---|---|---|
| 1,992,826 | Karasawa | Feb. 26, 1935 |
| 2,648,786 | Kritter | Aug. 11, 1953 |